D. W. ANTHONY.
LIQUID VENDING MACHINE.
APPLICATION FILED JULY 11, 1918.

1,352,645.

Patented Sept. 14, 1920.
8 SHEETS—SHEET 1.

FIG.-1.

WITNESSES:

INVENTOR:
DAVID W. ANTHONY.
BY
ATTORNEYS

D. W. ANTHONY.
LIQUID VENDING MACHINE.
APPLICATION FILED JULY 11, 1918.

1,352,645.

Patented Sept. 14, 1920.
8 SHEETS—SHEET 6.

INVENTOR:
DAVID W. ANTHONY.
BY Paul & Paul
ATTORNEYS

D. W. ANTHONY.
LIQUID VENDING MACHINE.
APPLICATION FILED JULY 11, 1918.

1,352,645.

Patented Sept. 14, 1920.
8 SHEETS—SHEET 7.

WITNESSES:
B. G. Hall
M. R. Dedigh

INVENTOR:
DAVID W.
ANTHONY.
BY
Paul Paul
ATTORNEYS

UNITED STATES PATENT OFFICE.

DAVID W. ANTHONY, OF MINNEAPOLIS, MINNESOTA, ASSIGNOR TO ANTHONY LIQUID VENDING MACHINE CO., OF MINNEAPOLIS, MINNESOTA, A CORPORATION OF MINNESOTA.

LIQUID-VENDING MACHINE.

1,352,645.        Specification of Letters Patent.     Patented Sept. 14, 1920.

Application filed July 11, 1918. Serial No. 244,356.

*To all whom it may concern:*

Be it known that I, DAVID W. ANTHONY, a citizen of the United States, resident of Minneapolis, county of Hennepin, State of Minnesota, have invented certain new and useful Improvements in Liquid - Vending Machines, of which the following is a specification.

My invention relates to machines for vending liquids and particularly a liquid fuel for automobiles, trucks, motorcycles and the like.

The object of my invention is to provide a liquid fuel dispensing machine by means of which a purchaser upon the deposit of a coin of certain denomination and operating a crank can obtain the value of the coin in liquid fuel, the operation of the machine after the initial movement of the crank in measuring the oil and delivering it or the automobile or other vehicle being entirely automatic.

A further object is to simplify and improve the dispensing mechanism shown and described in my pending application for U. S. patent filed October 31, 1916, Serial No. 128,752.

The invention consists generally in various constructions and combinations, all as hereinafter described and particularly pointed out in the claims.

In the accompanying drawings forming part of this specification.

Figure 15:
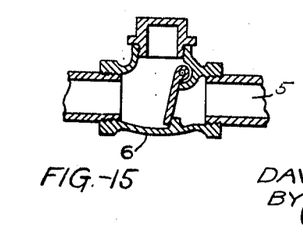
Fig. 15 is a detail sectional view of the check valve between the auxiliary oil tank and the main supply tank, (not shown).

In the drawing, 2 represents a suitable frame in which the operating mechanism of the dispensing machine is mounted and 3 is a jacket encircling said frame for concealing and protecting said mechanism. 4 is an auxiliary tank located beneath the dispensing machine and having a pipe connection 5 with a main fuel supply tank (not shown) located preferably above the level of the tank 4 for delivery of the fuel oil by gravity thereto. A check valve 6 is located in the pipe line leading from the main supply to the auxiliary tank and arranged to open under pressure of the oil in the main supply tank and close when air pressure is admitted to the auxiliary tank. This check valve is shown in detail in Fig. 15.

Figure 12:
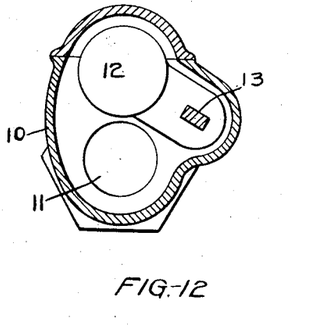
Fig. 12 is a sectional view of one of the gate valves which control the flow of the liquid fuel to the dispensing tank.
Figure 13:
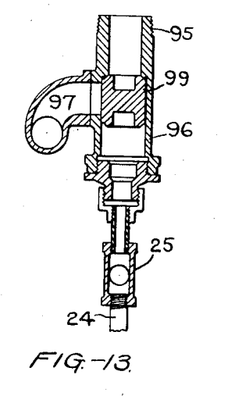
Figs. 13 and 14 are detailed sectional views showing the different positions of the valve for controlling the flow of fuel from the dispensing tank.
Figure 14:
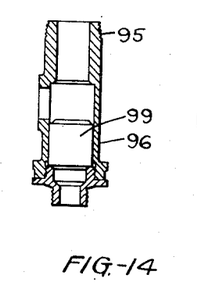

A pipe 7 leads from the auxiliary tank and extends up through the frame of the machine to a manifold 8 and from this manifold pipes 9 lead to a series of valves which control the delivery of the liquid fuel to the dispensing tank in the top of the machine. I have shown three of these pipes and a corresponding number of valves, each valve being opened by mechanism connected therewith upon the deposit of a coin of a certain denomination in the machine. The valve remains open to allow the continued flow of the liquid until it is automatically closed by an overflow mechanism hereinafter described, provision being made, of course, that the quantity of fuel delivered will correspond in value to the coin deposited. These valves are preferably in the form of gates shown in detail in Fig. 12, a suitable casing 10 inclosing a port 11 wherein the gate 12 is mounted on a stem 13. I prefer to provide three of these valves to adapt the machine for dispensing fuel of the value of one dollar, fifty cents and twenty-five cents, the coins of this denomination being convenient to deposit and representing the amounts which a purchaser would usually desire to pay for a supply of fuel, the twenty-five cent supply being particularly adapted for motorcycles, where the carrying capacity is small. The valves themselves and the mechanisms controlling them all correspond substantially and it will be unnecessary, therefore, to describe the parts and operation of each in detail. I will therefore explain the mechanism for operating one of them and indicate the corresponding parts for operating the other valves by the same reference numerals with the addition of the exponents, and in a corresponding way I will indicate the pipes leading from the valves to their respective chambers in the dispensing tank above.

In describing the parts I will refer to the valve at the right hand side of the machine or the one controlling the flow of fuel to the twenty-five cent tank chamber. This valve I will designate by its numeral 10 and the other corresponding valves as 10ª and 10ᵇ. The pipes leading from these valves are 14, 14ª, and 14ᵇ, and extend through the bottom of the dispensing tank for communication with the chambers 15, 16 and 17. These chambers are separated from each other by curved partitions 18 and 19, the partition 18 being inclosed by the chamber 16 and the partition 19 inclosing the partition 18 and coöperating with the outer wall of the tank to form the dollar chamber 17 see Fig. 3ª. Into these chambers the liquid fuel is delivered by pressure of the air in the auxiliary chamber when admitted thereto and the valve controlling the flow of fuel to the dispensing chamber is opened. This air pressure is delivered to a pipe 20 from a suitable source of pressure, a pressure gage 21 indicating the amount of air in the pipe, a branch 22 leading from the pipe 20 through an air controlling valve 23 to the auxiliary tank 4 and from this branch pipe a pipe 24 leads to an air manifold 25 in the top of the machine that is connected with the valves for controlling the discharge of the liquid fuel from the dispensing tank as will hereinafter be described in detail.

I will now describe in detail the mechanism controlled through the deposit of a coin in the machine for operating the valve of the twenty-five cent chamber to admit fuel of the value of twenty-five cents to that chamber.

Figure 1:
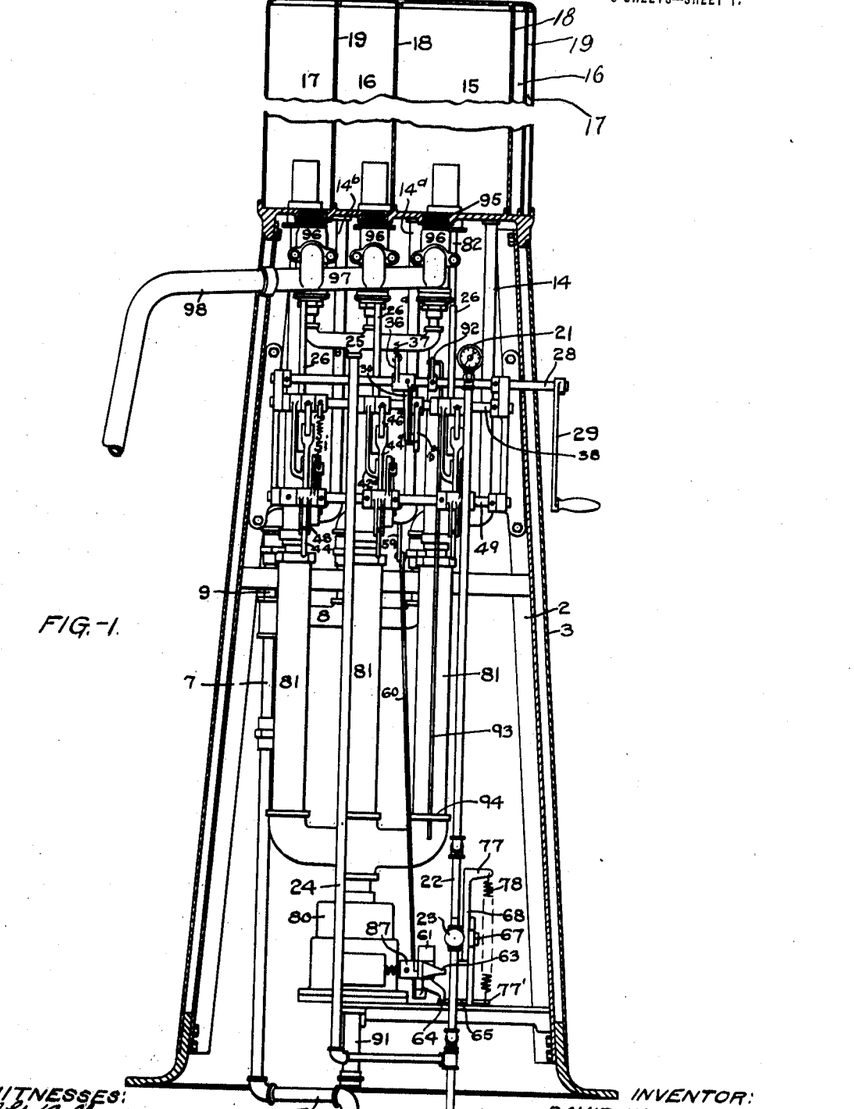
Figure 1 is a vertical sectional view of a liquid vending machine embodying my invention.
Figure 2:
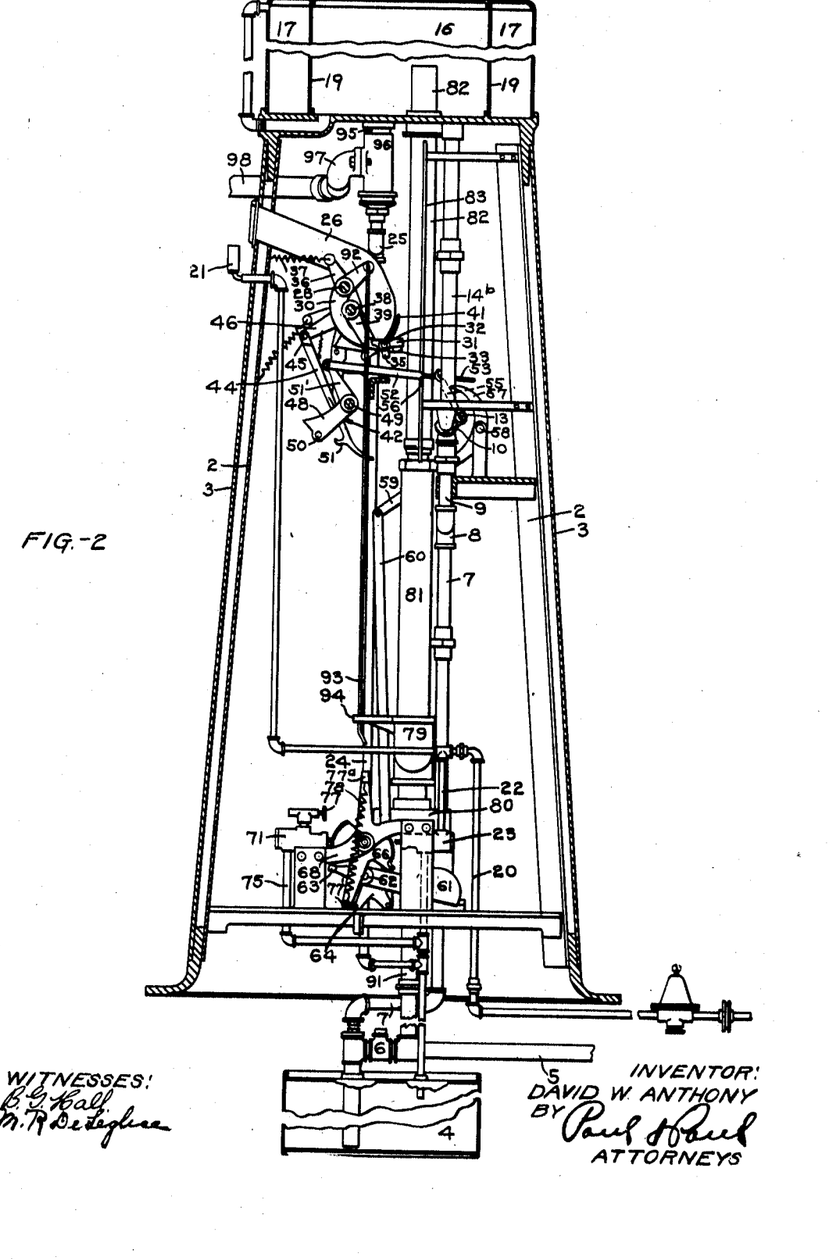
Fig. 2 is a similar view, taken on a section line at right angles substantially to the section line of Fig. 1.

Referring to Figs. 5, 6 and 7, 26 represents a chute in which the twenty-five cent piece is deposited. The coin, after sliding down through the chute, rests upon a ledge 27. 28 is a rock shaft provided with an operating crank 29 on the outside of the machine, said shaft being horizontally mounted in the machine frame, as shown clearly in Fig. 1. This shaft is provided with a downwardly and rearwardly curved arm 30. A tilting dog 31 is pivoted at 32 on said arm and normally rests by gravity upon the projecting end 33 of said arm. This dog is provided with lugs 34 and 35. The hub of the arm 30 has an upwardly projecting arm 36 connected with the machine frame by a spring 37 which normally resists rocking of the shaft 28 to swing the arm 30 forward. A rock shaft 38 is journaled in bearings below the shaft 28 and provided with a depending arm 39 in the path of the dog 31 to be engaged and operated by said dog when said arm 30 is swung forward by the rocking of the shaft 28.

Figure 5:
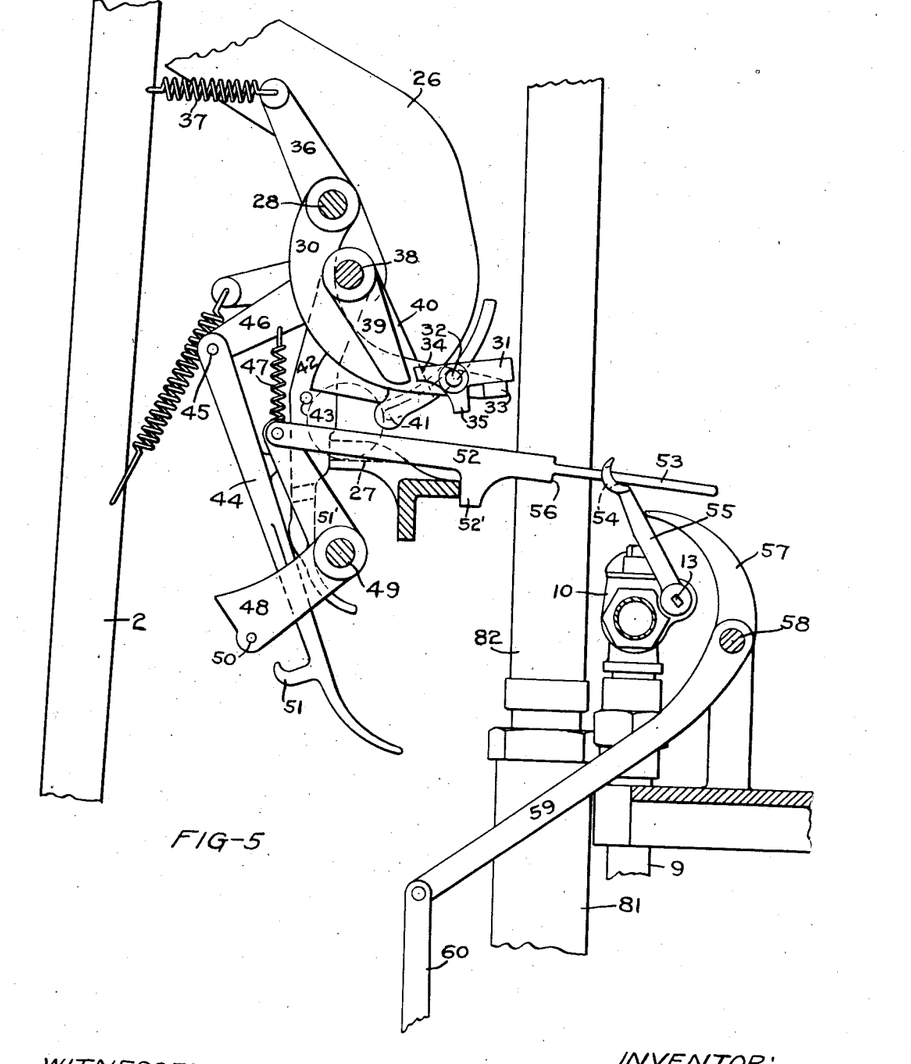
Fig. 5 is a detail sectional view of the coin controlled mechanism, showing the normal position of the parts before the deposit of a coin.

An arm 40 depends from the shaft 38 and has a part 41 to contact with the edge of the coin on the ledge 27 supported in an upright position thereon. An arm 42 is loosely mounted on the shaft 38 and has a pin 43 in the path of the coin on the ledge 27 and the lower end of the arm 42 bears on an arm 44 which is pivoted at 45 to an arm 46 formed preferably on the hub of the arm 40 and having a spring 47 connected with the arm 44 for normally holding the said arm 44 in a retracted position, as shown in Fig. 5. An arm 48 is mounted on a shaft 49 and has a pin 50 in position to engage a hook 51 on the arm 44 for rocking the said arm 48 when the arm 44 is thrown outwardly by engagement of the arm 42 therewith after a coin has been deposited in the chute. Until a coin has been deposited, no forward movement of the arm 42 will take place upon the rocking of the shaft 28, although the arm 44 will be raised from its normal position, as in doing so it will clear the pin 50 and will not actuate the arm 48. An arm 51' is mounted on the shaft 49 and pivotally connected with a bar 52 having a reduced end 53 that is slidable in a guide 54 provided on the end of a lever 55 that is mounted on the stem 13 of the gate valve 12. The bar is provided with a shoulder 56 and when it contacts with the guide 54, the lever 55 will be actuated to open its valve and admit fuel oil to the dispensing chamber with which that particular valve is connected. The arm 52 is provided with a depending lug 52' for contact with the ledge 27 to limit the downward movement of the arm 48.

Figure 6:
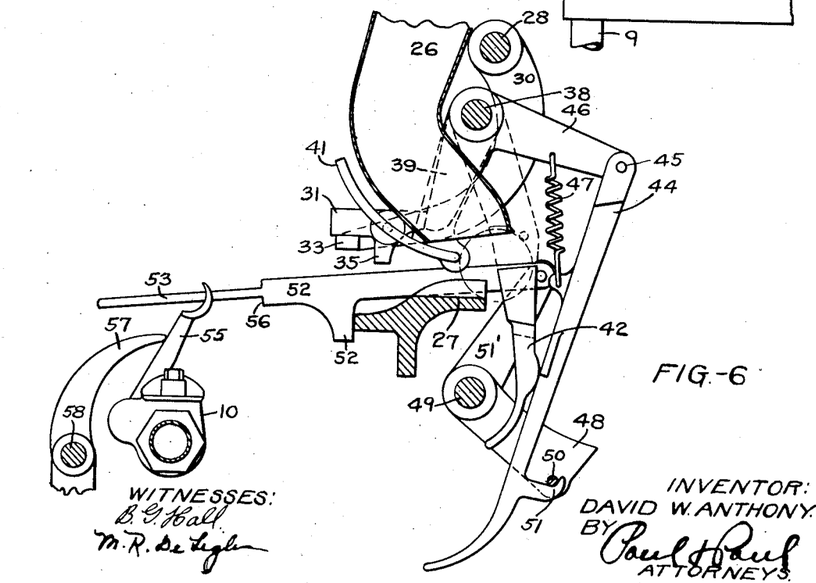
Fig. 6 is a similar view, showing the position assumed by the mechanism after the deposit of a coin and when the operating mechanism has partially completed its stroke.
Figure 7:
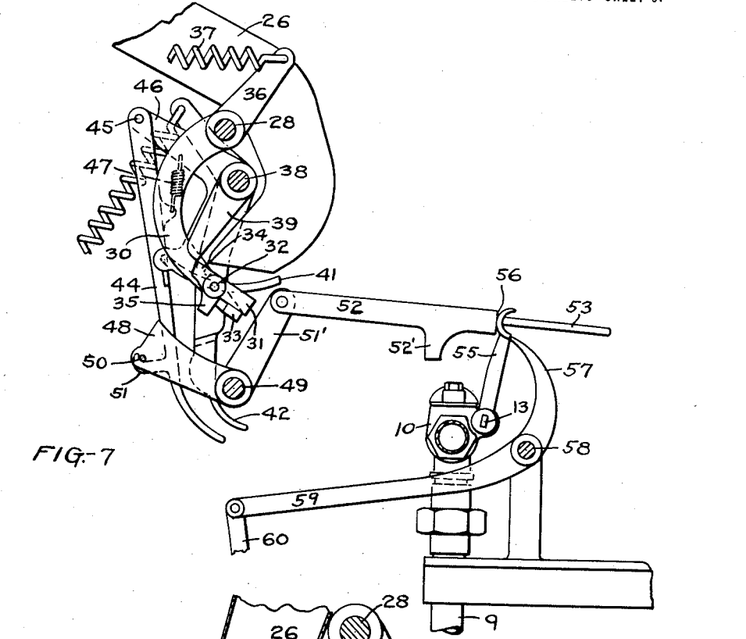
Fig. 7 is a detail sectional view showing the position of the parts at the completion of the movement of the inlet valve operating mechanism.
Figure 8:
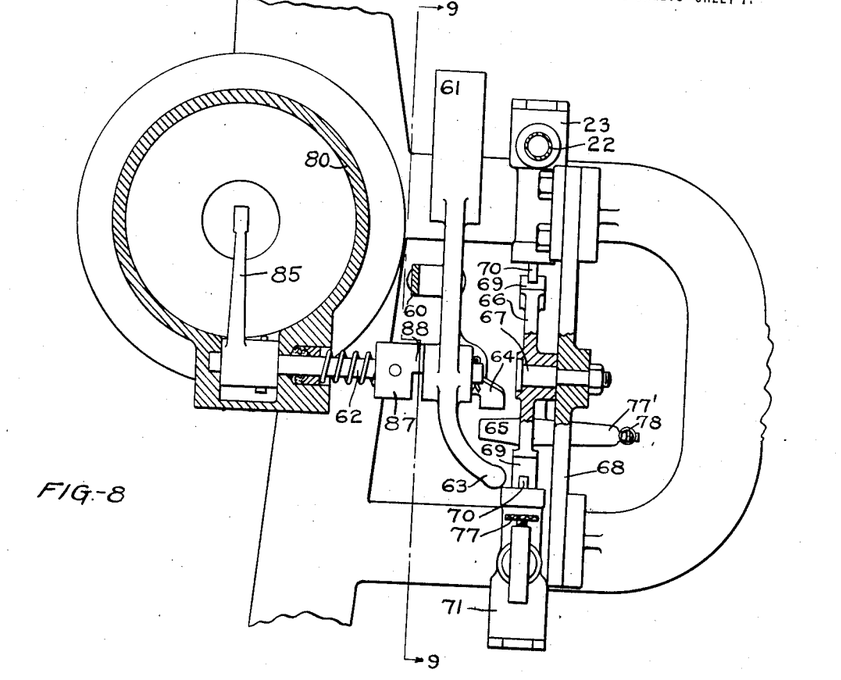
Fig. 8 is a horizontal sectional view through the overflow chamber showing the mechanism controlled thereby.
Figure 9:
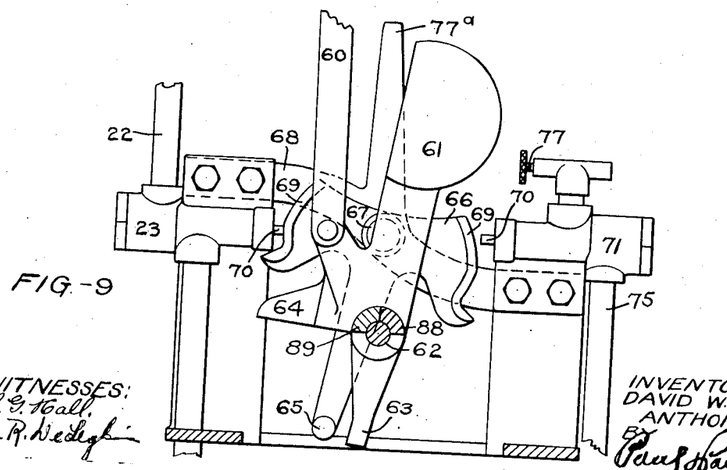
Fig. 9 is a sectional view on the line 9—9 of Fig. 8, with the weight in an upright position.
Figure 11:
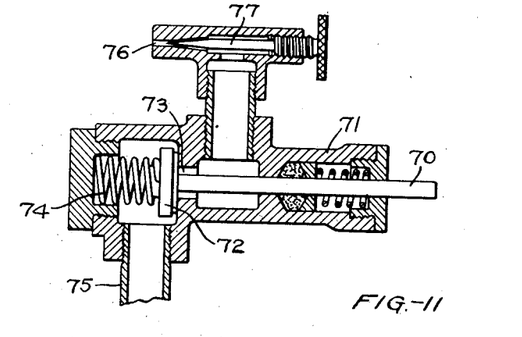
Fig. 11 is a sectional view through the air relief valve for the auxiliary tank.

In Fig. 6 I have shown the position of the parts when, through the operation of the rock shaft and the transmission of pressure through the coin deposited in the chute, the arm 44 has been lifted and swung outward into engagement with the pin 50. As here shown, the bar 52 is in position to be moved lengthwise by the rocking of the arm 51' to engage the shoulder 56 with the lever 55 and open the valve 12. In the path of this lever 55 is an arm 57 mounted on a rock shaft 58 that is provided with a lever 59 pivotally connected by a bar 60 with a weighted arm 61 pivoted at 62 to oscillate in a vertical plane and provided with projecting lugs 63 and 64 on opposite sides of the depending end 65 of a T-shaped cam member 66 which is centrally pivoted at 67 on a bar 68 (see Figs. 8 and 9). This T-shaped member is provided with cam surfaces 69 positioned to contact with the stem 70 of the air controlling valve 23, heretofore referred to. A similar valve 71 is provided on the other side of the T-shaped member from the valve 23 and is shown in section in Fig. 11. These valves are of the same construction and a detailed description of one will suffice for both. The stem 70 is provided with a disk 72 for closing a port 73, said disk being normally held in its closed position by a compression spring 74. A pipe 75 connects the valve 71 with the air pressure pipe 20 between the point of connection of the pipe 24 with the pipe 20 and the valve 23. This valve 71 has an exhaust port 76 communicating with one side of the port 73 and provided with a needle valve 77 for regulating the discharge of air through the exhaust. By the adjustment of this needle valve the period of exhaust may be increased or decreased, as desired, and a suitable time allowed for the liquid fuel to come to a level or settle in the dispensing tank chamber before the outlet valve is opened, as will appear from the following description. This valve 71 will also have the further function of allowing the escape of air from the auxiliary tank in case the inlet valve 23 should leak. The bar 68 has an arm 77ª thereon and the member 66 has an arm 77'. A spring 78 connects these arms for holding the member 66 in either of its tilted positions to operate the valve 23 or the valve 77.

When the bar 60 is raised by the raising of the lever 59, the weighted member 61 will be rocked on its pivot and the cam surface 69 moved into engagement with the stem of the valve 23 to open the valve and admit air pressure to the auxiliary tank, following, of course, the deposit of a proper coin in the chute. This movement of the bar 60 will raise the weighted member to the position shown in Fig. 9. The liquid inlet valve leading to the dispensing tank having previously been opened, the oil will flow up through the inlet pipe and from thence to the proper chamber in the dispensing tank.

Figures 3, 3A:
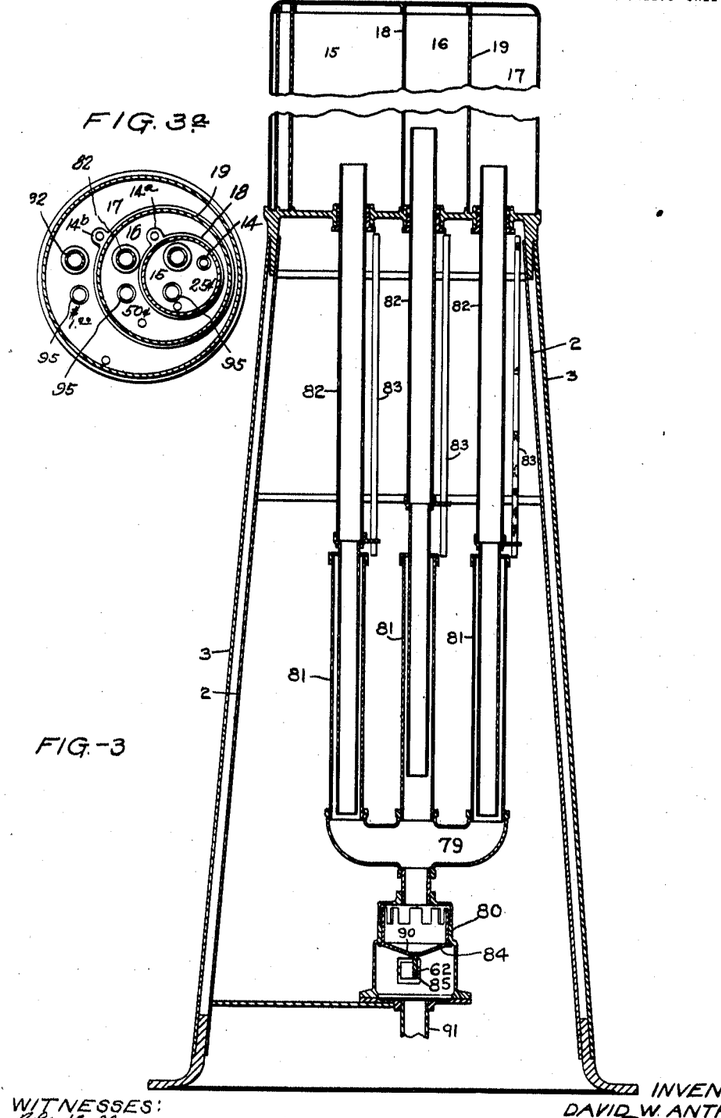
Fig. 3 is a vertical sectional view through the overflow mechanism, showing its position with respect to the dispensing tank, Fig. 3ᵃ is a horizontal sectional view through the dispensing tank, showing the arrangement of the chambers therein.
Figure 4:
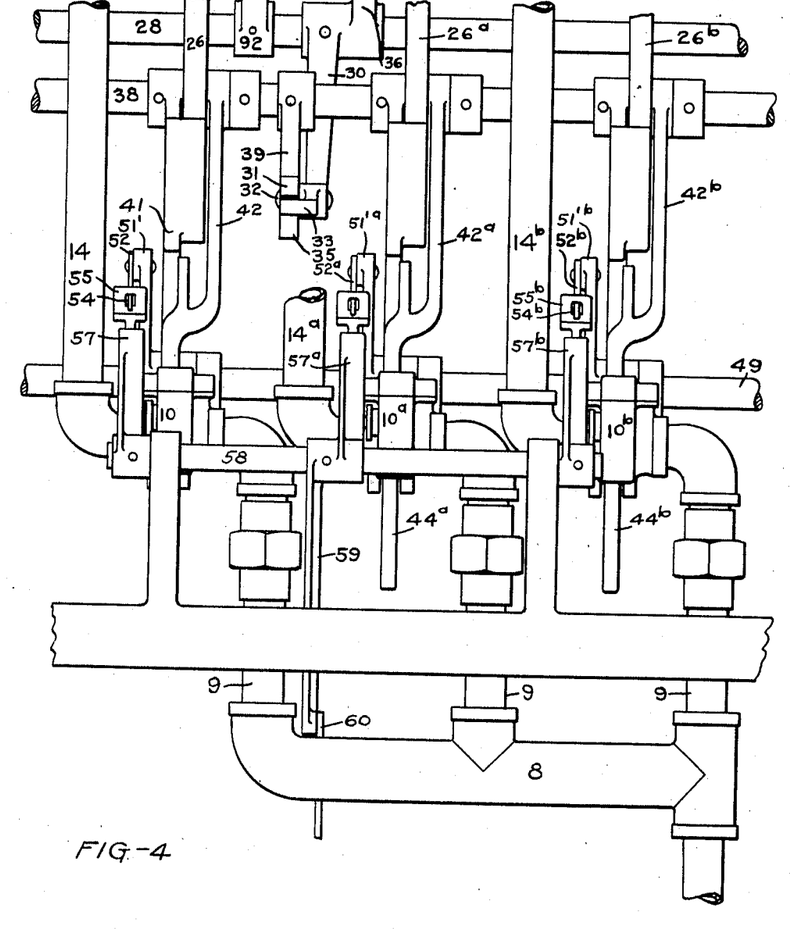
Fig. 4 is a detail view of a portion of the operating mechanism, looking at the rear of the machine, and showing the position of the valve which controls the delivery of the liquid fuel to the dispensing tank.

Referring now to Fig. 3, I have shown an overflow apparatus by means of which the excess liquid fuel delivered to a chamber of the tank will operate automatically to shut off the air and close the inlet valve. This mechanism consists of a manifold 79 supported on the casing 80 of an overflow chamber and having pipes 81 projecting upwardly therefrom with which tubes 82 are mounted to telescope, the upper ends of said tubes projecting through the bottom of the dispensing tank in the respective chambers therein. These tubes 82 are capable of vertical adjustment to raise the point of overflow in the dispensing tank so that a varying quantity of the fuel may be delivered, according to the price per gallon. The higher the telescoping pipe is raised in the chamber, the greater the amount of fuel will flow therein before overflow takes place, and the lower the adjustment of the telescoping pipe the sooner it will overflow and cause the closing of the inlet valve controlled by that overflow. A gage bar 83 is preferably provided in connection with each telescoping pipe, so that the machine attendant can readily determine the proper adjustment of the pipe for the value of the oil delivered and the price per gallon. A cup 84 is mounted in the overflow chamber 80 and normally rests upon an arm 85 mounted on the shaft 62 which carries the weighted arm 61, the hub of the arm being secured to said shaft.

Figure 10:
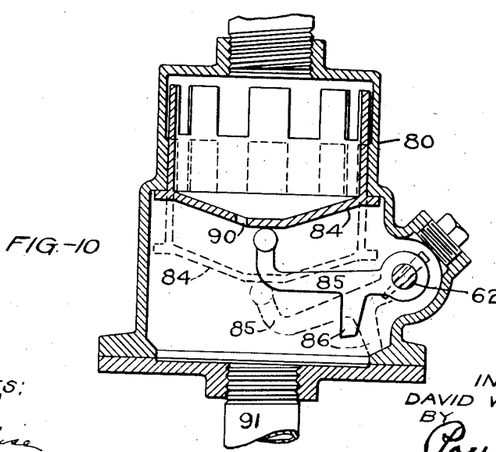
Fig. 10 is a vertical sectional view through the overflow chamber and cup therein.

The arm 85 has a lug 86 which engages the bottom of the overflow valve casing and limits the downward movement of the cup 84. A hub 87 is mounted on the shaft 62 and has a shoulder 88 arranged to contact with a similar shoulder 89 on the hub of the weighted arm for returning the said arm to its normal position and opening the exhaust valve 71 and closing the liquid inlet valve 10 when the cup 84 has been lowered to the dotted line position of Fig. 10 by the weight of the overflow from the dispensing tank chamber. The cup remains in its dotted line position until another coin is inserted and then the weighted arm 61 is raised to an upright position and the shoulder 89 engages the shoulder 88 and returns the cup to its original position and opens the inlet valve 23.

The overflow in the cup 84 discharges through the port 90 and the pipe 91. An arm 92 is preferably provided on the shaft 28 connected to a rod 93 that is vertically slidable in a guide 94 and adapted to drop in front of the weighted arm 61 and prevent it from jumping back when raised and allowing the inlet valve to close before a sufficient quantity of the liquid fuel has been delivered in exchange for the coin deposited. This locking rod will be automatically withdrawn by the spring 37 to release the tilting weight when the operator releases the crank 29.

The manifold 25 has pipe connections 95 with the respective dispensing tank chambers and each pipe has a valve casing 96 therein communicating through the outlet manifold 97 with a delivery hose 98 through which the liquid fuel is discharged into the tank of the car or vehicle, or any vessel that will hold liquid. A sliding valve 99 is mounted in the casing 96 and normally rests by gravity on the lower end of said casing, leaving a clear passage from the dispensing tank through the outlet manifold 97 to the delivery pipe 98. This is the normal position of the valve. As soon as the valve 23 is opened to admit air to the auxiliary tank, the pressure operating through the pipe 24 will raise the valve 99 to its closed position and shut off the passage to the delivery pipe and the valve will remain in this position as long as the air is on the auxiliary tank. Upon the opening of the exhaust valve 71 and the exhaust of the air through the port 76, the valve 99 will drop by gravity and open the delivery passage, but this dropping of the valve will not take place immediately, as I prefer to adjust the needle valve 77 to retard the escape of the exhaust sufficiently to allow the liquid fuel to come to a state of rest in the dispensing tank before the valve controlling the delivery passage is opened, and the period during which this delivery valve remains closed after the inlet valve is closed will depend, of course, upon the rapidity of the escape of air at the exhaust.

The operation of the machine is as follows: A purchaser, desiring say twenty-five cents' worth of gasolene, will deposit a coin of this denomination in the proper chute indicated in this drawing at 26 and will turn the shaft 28 by means of the crank 29. The coin lodging on the ledge 27 between the member 41 and the pin 43, will transmit movement of the arm 40 to the arm 42 through the rocking of the shaft 28 and the engagement of the dog 31 with the arm 39. The rocking of the shaft 38 will lift the arm 46 and the pressure of the arm 42 on the arm 44 will force it outwardly into engagement with the pin 50 and thereupon the shaft 49 will be rocked to project the bar 52 and rock the lever 55 to open the liquid fuel inlet valve leading to the twenty-five cent compartment in the dispensing tank. At the same time the shaft 58 will be rocked to lift the bar 60 and lift the weighted member 61 to actuate the T-shaped member 66 and open the air inlet valve 23 and admit air pressure to the auxiliary tank and thereupon the oil will flow therefrom up through the open inlet valve to its proper chamber in the dispensing tank. This flow will continue until the level of the liquid in the tank rises above the overflow opening, when the oil flowing down into the overflow cup will accumulate therein and gradually depress the cup to tilt the weighted member so that it will return to its normal position, allowing the air inlet valve to close, and opening the auxiliary tank to the air exhaust. Then, when sufficient exhaust has taken place, the gravity valve in the delivery passage will drop automatically and allow the oil in the dispensing tank chamber to flow out into the receiving tank of the car or other vehicle. The dog 31 on the return of the arm 30 to its normal position will tilt on its pivot and clear the arm 39 and assume the position shown in Fig. 5, ready to again engage the arm 39 when the shaft 28 is rocked.

I claim as my invention:

1. The combination, with a liquid supply tank, of a dispensing tank having a discharge opening, an inlet pipe leading from said supply tank to said dispensing tank, a valve normally closing the passage through said inlet pipe, mechanism for admitting air pressure to said supply tank and simultaneously opening said valve, and an overflow device provided with means mounted to open said supply tank to the exhaust and close said valve when a predetermined quantity of liquid has entered said dispensing tank.

2. The combination, with a liquid supply tank, of a dispensing tank having a discharge opening and valve, an inlet pipe leading from said supply tank to said dispensing tank, a valve normally closing the passage through said inlet pipe, an air supply pipe for said supply tank, and a valve therefor, an exhaust valve for said supply tank, means for simultaneously opening said inlet pipe valve and said air supply valve and means actuated by the overflow of the liquid in said dispensing tank for closing said liquid and air supply valves and opening said air exhaust valve.

3. The combination, with a liquid supply tank, of a dispensing tank having a discharge opening, an inlet pipe leading from said supply tank to said dispensing tank, a valve in said inlet pipe normally closed, an air inlet pipe for said supply tank and valve therefor, an air exhaust valve for said supply tank, a tilting member disposed between said air exhaust and inlet valves for operating the same alternately, mechanism for opening said liquid inlet valve and actuating said tilting device to open said air inlet valve and an overflow device provided with means for closing said liquid inlet valve and operating said tilting device to allow said air inlet valve to close and simultaneously open said air exhaust valve.

4. The combination, with a liquid supply tank, of a dispensing tank having a discharge opening and valve therefor, an inlet pipe leading from said supply tank to said dispensing tank, a valve normally closing said inlet pipe, mechanism for admitting air pressure to said supply tank and opening said inlet valve, a pipe leading from said air supply to said discharge valve for closing said discharge valve by air pressure when said inlet valve is opened, and mechanism controlled by the rise of the liquid in said dispensing tank above a predetermined point for releasing the air from said supply tank and positively closing said inlet valve, and means for slowly releasing the air from said discharge valve pipe and allowing said discharge valve to open a predetermined period after the closing of said inlet valve.

5. The combination, with a liquid supply tank, of a dispensing tank having a discharge opening and valve therefor normally open, an inlet pipe leading from said supply tank to said dispensing tank, an inlet pipe valve normally closed, an air pressure pipe and valve for said supply tank, and an air exhaust valve for said supply tank, means for opening said air pressure valve to admit air to said supply tank and opening said inlet pipe valve, an air supply pipe for said discharge valve, mechanism for opening said air exhaust valve and closing said inlet pipe valve when a predetermined quantity of liquid has been delivered to said tank, and a needle valve for controlling the release of air from said discharge valve pipe and allowing it to open by gravity a predetermined interval after the closing of said inlet valve.

6. The combination, with a liquid supply tank, of a dispensing tank having a plurality of independent chambers therein and discharge openings for said chambers, an inlet pipe leading from said supply tank and having branch pipes communicating with said chambers, valves normally closing the passages through said branch pipes, means for admitting air pressure to said supply tank and opening one of the valves in said branch pipes and an overflow mechanism provided with means actuated through the rise of the liquid in the corresponding chamber above a predetermined level for closing the air inlet to said supply tank and the valve in the branch pipe.

7. The combination, with a liquid supply tank, of a dispensing tank having three chambers therein, and discharge openings therefor, an inlet pipe leading from said supply tank and having three branch pipes communicating respectively with said chambers, valves normally closing said branch pipes, an air inlet pipe for said supply tank and valve therefor, and an exhaust for said supply tank, mechanism for simultaneously opening said air inlet valve and one of said branch pipe valves, an overflow device having a pipe connection with each of the chambers in said dispensing tank and said overflow device including means actuated when the level of the liquid in said chambers rises above a predetermined level for closing said air inlet and branch pipe valve and opening said air exhaust valve.

8. The combination, with a liquid supply tank, of a dispensing tank having a discharge opening, an inlet pipe leading from said supply tank to said dispensing tank, a valve normally closing the passage through said inlet pipe, mechanism for admitting air pressure to said supply tank and opening said valve, and mechanism actuated by the overflow of said dispensing tank for automatically shutting off the air pressure to said supply tank and opening it to exhaust and closing said inlet pipe valve when a predetermined quantity of liquid has been delivered to said dispensing tank.

9. A liquid dispensing apparatus comprising a supply tank, a dispensing tank having a pipe connection with said supply tank, and partitions separating said dispensing tank into chambers, one partition being inclosed by one of the chambers and the outer partition forming the wall of that one chamber coöperating with the outer wall of said dispensing tank to form another chamber, each of said chambers being connected with the supply pipe from said supply tank and having discharge ports and valves therefor and inlet valves controlling the flow of liquid to said chambers, mechanism for opening an inlet valve and admitting air pressure to said supply tank, and mechanism for closing said inlet-valve and releasing the air pressure from said tank when a predetermined volume of liquid is delivered to a chamber.

10. A liquid vending apparatus comprising a dispensing tank having partitions separating said tank into chambers, one partition being inclosed by one of said chambers and the outer partition forming the wall of said one chamber coöperating with the outer wall of said dispensing tank to form another chamber, each of said chambers having a discharge opening and valve therefor, an inlet pipe leading from a source of oil supply and communicating with said chambers respectively and inlet valves controlling the flow of liquid to said chambers, mechanism for selectively opening an inlet valve and admitting liquid to a chamber, and means controlled by the rise of the liquid in a chamber for shutting its inlet valve and opening its discharge valve.

11. The combination, with a liquid supply tank, of a dispensing tank having a plurality of chambers formed therein, each provided with a discharge opening and a valve therefor, normally open, an inlet pipe leading from said supply tank and having branch pipes communicating with said chambers respectively, valves normally closing said branch pipes, an air supply pipe communicating with said supply tank and with said discharge valves, an air inlet valve for said supply pipe, an exhaust valve for said supply tank and said air supply pipe, mechanism for opening said air inlet valve and one of said branch pipe valves and admitting pressure to close the discharge valve, and means for automatically closing said air inlet valve and said branch pipe valve and opening said exhaust valve when a predetermined quantity of liquid has been delivered to a chamber, the discharge valve for that chamber being mounted to open a predetermined period after the closing of the branch pipe valve, the length of said period being controlled by the escape of air at said exhaust valve and the release of pressure on said discharge valve.

12. A liquid dispensing apparatus comprising a supply tank, a dispensing tank having a plurality of chambers and discharge openings and valves therefor, an inlet pipe leading from said supply tank and having branch pipes communicating with said chambers respectively and valves for said branch pipes, air inlet and exhaust valves for said supply tank, mechanism for opening one of said branch valves and said air inlet valve and closing a discharge valve and for automatically closing said branch valve and said air inlet valve and opening said exhaust and allowing said discharge valve to open when a predetermined quantity of liquid has been delivered to a chamber of said dispensing tank.

13. A liquid dispensing apparatus comprising a dispensing tank having a discharge opening and a valve normally open, means for delivering liquid to said tank and closing said discharge valve, and means for automatically shutting off the delivery to said tank when a predetermined volume of liquid has been delivered thereto and automatically opening said discharge valve a predetermined interval after such delivery.

14. The combination, with a liquid supply tank, of a dispensing tank having a discharge opening and valve therefor, an inlet pipe leading from said supply tank to said dispensing tank, a valve normally closing said inlet pipe, mechanism for admitting air pressure to said supply tank and opening said inlet valve, a pipe leading from said air supply to said discharge valve for closing said discharge valve by air pressure when said inlet valve is opened, mechanism for releasing the air from said supply tank and closing said inlet valve when a predetermined supply of liquid has been delivered to said dispensing tank, and releasing the air from said discharge valve pipe and allowing said discharge valve to open after the closing of said inlet valve.

15. A liquid dispensing apparatus comprising a supply tank, a dispensing tank having a discharge opening and valve, normally open, an inlet pipe leading from said supply tank to said dispensing tank, a valve for said inlet pipe normally closed, mechanism for admitting pressure to said supply tank and opening said inlet valve and closing said discharge valve and means for automatically cutting off the pressure to said supply tank and closing said inlet valve and opening said discharge valve when a predetermined volume of liquid has been delivered to said dispensing tank.

16. A liquid dispensing apparatus comprising a tank having a plurality of chambers and discharge openings and normally open valves, means for delivering liquid to any one of said chambers and closing the valve therefor, means for shutting off the delivery of liquid when a predetermined quantity has entered said chamber, and allowing its discharge valve to open a predetermined period after the delivery of the liquid has ceased.

17. A liquid dispensing apparatus comprising a dispensing tank having a plurality of chambers, each having a discharge opening and valve therefor, means for selectively delivering liquid to any one of said chambers, and an overflow device provided with means for automatically shutting off such delivery when a predetermined volume has been delivered.

18. The combination, with a liquid supply tank, of a dispensing tank having a discharge opening and valve therefor, an inlet pipe leading from said supply tank to said dispensing tank, a valve for said inlet pipe, mechanism for admitting air pressure to said supply tank and opening said inlet valve, said discharge valve being connected with said supply tank to close by air pressure when said inlet valve is opened, said discharge valve being mounted to return by gravity to its normal open position when said inlet valve has been closed.

19. A liquid vending machine comprising a plurality of chambers provided with inlet and discharge pipes and valves therefor, pipes projecting into said chambers respectively and mounted to receive liquid from said chambers when it rises above a predetermined level therein, a manifold connected with said last named pipes, a casing communicating with said manifold, an overflow device within said casing and provided with means actuated by the overflow liquid delivered by said pipes for closing said inlet valves.

20. A liquid vending machine comprising a plurality of chambers, each provided with inlet and discharge pipes and valves therefor, telescoping pipes projecting into said chambers respectively and mounted to receive the liquid from said chambers when it rises above a predetermined level therein, a casing communicating with said telescoping pipes, an overflow device within said casing and provided with means actuated by the overflow liquid delivered by said pipes for closing said inlet valves.

21. A liquid vending machine comprising a plurality of chambers, each provided with inlet and discharge pipes and valves therefor, adjustable pipes projecting into said chambers respectively and mounted to receive the liquid from said chambers when it rises above a predetermined level therein, and an overflow device provided with means actuated by the overflow liquid delivered by said pipes for closing said inlet valves.

22. The combination, with a liquid supply tank having an air supply valve and an exhaust valve, of a dispensing tank having a discharge port, an inlet pipe leading from said supply tank to said dispensing tank, an inlet valve for said pipe, an oscillating cam member, mechanism for opening said inlet pipe valve and operating said cam member to open said air supply valve, and an overflow device provided with means actuated by the rise of the liquid above a predetermined level in said dispensing tank for operating said mechanism and said cam member to close said inlet and air supply valves and open said air exhaust valve.

23. The combination, with a liquid supply tank, of a dispensing tank having a discharge port and a pipe connection with said supply tank, and an inlet valve therefor, air supply and exhaust valves for said supply tank, oppositely arranged, an oscillating member mounted to alternately open said air supply valve and said exhaust valve, mechanism for opening said inlet valve and moving said member to open said air supply valve, and an overflow device provided with means actuated by the rise of the liquid in said dispensing tank above a predetermined level for operating said member to open said exhaust valve and close said inlet valve.

24. The combination, with a liquid supply tank, of a dispensing tank having a discharge port and a pipe connection with said supply tank, an inlet valve for said pipe, air supply and exhaust valves for said supply tank, a rocking member mounted to alternately open said air supply and exhaust valve, a swinging arm operatively connected with said rocking member, mechanism for opening said inlet valve and moving said arm to operate said member and open said air supply valve, and an overflow device provided with means actuated by the rise of the liquid above a predetermined level in said dispensing tank for returning said arm to its normal position, closing said inlet valve and again operating said member to open said air exhaust valve.

25. The combination, with a liquid supply tank, of a dispensing tank having a discharge port and a pipe connection with said supply tank, an inlet valve for said pipe connection, spring-pressed air supply and exhaust valves for said supply tank, normally closed, a tilting member having cam surfaces positioned between the stems of said air supply and exhaust valves for opening said valves alternately, mechanism for opening said inlet valve and moving said member to open said air supply valve, and mechanism controlled by the rise of the liquid in said dispensing tank above a predetermined level for closing said inlet valve and operating said member to release said air supply valve and open said exhaust valve.

26. The combination, with a liquid supply tank, of a dispensing tank having a discharge port and a pipe connection with said supply tank, an inlet valve for said pipe connection, spring-pressed air supply and exhaust valves for said supply tank, normally closed, mechanism for opening said inlet valve and said air supply valve against the tension of its spring, and an overflow mechanism provided with means actuated by the rise of the liquid in said dispensing tank above a predetermined level for closing said inlet valve, releasing said air supply valve to allow it to close, and opening said exhaust valve.

27. A liquid dispensing apparatus comprising a supply tank, a dispensing tank having a plurality of chambers therein, and discharge ports and valves for said chambers, inlet pipes communicating with said supply tank and said dispensing tank and valves for controlling the flow of liquid through said pipes to said chambers respectively, mechanism for operating said valves, and overflow pipes projecting upwardly into said chambers respectively and adjustable vertically therein and connected with said supply tank for receiving the overflow liquid in said chambers when it rises above certain predetermined levels and returning it to said supply tank, and means communicating with said overflow pipes and actuated by the overflow liquid for moving said valve operating mechanism to close said inlet valves.

In witness whereof, I have hereunto set my hand this 3d day of July, 1918.

DAVID W. ANTHONY.